US007952764B2

(12) United States Patent
He

(10) Patent No.: US 7,952,764 B2
(45) Date of Patent: May 31, 2011

(54) HIERARCHICAL COLOR ERROR DIFFUSION IN A CMYKRGB DOMAIN

(75) Inventor: Zhen He, Sherwood, OR (US)

(73) Assignee: Xerox Corporation, Norwalk, CT (US)

(*) Notice: Subject to any disclaimer, the term of this patent is extended or adjusted under 35 U.S.C. 154(b) by 704 days.

(21) Appl. No.: 12/025,842

(22) Filed: Feb. 5, 2008

(65) Prior Publication Data
US 2009/0195836 A1    Aug. 6, 2009

(51) Int. Cl.
H04N 1/40 (2006.01)
G06K 15/00 (2006.01)

(52) U.S. Cl. ............ 358/3.05; 358/3.03; 358/3.06; 358/3.2; 358/3.22

(58) Field of Classification Search .................. None
See application file for complete search history.

(56) References Cited

U.S. PATENT DOCUMENTS

| | | | |
|---|---|---|---|
| 5,010,814 A * | 4/1991 | Shishikura | 101/211 |
| 5,621,546 A | 4/1997 | Klassen et al. | |
| 5,687,300 A * | 11/1997 | Cooper | 358/1.9 |
| 5,748,785 A | 5/1998 | Mantell et al. | |
| 5,784,496 A | 7/1998 | Mantell | |
| 5,991,512 A * | 11/1999 | Shaked et al. | 358/1.9 |
| 6,014,233 A | 1/2000 | Fan et al. | |
| 6,157,469 A | 12/2000 | Mestha | |
| 6,250,733 B1 | 6/2001 | Yao et al. | |
| 6,501,564 B1 | 12/2002 | Schramm et al. | |
| 6,870,644 B2 | 3/2005 | Schramm et al. | |
| 7,499,203 B2 | 3/2009 | Yao | |
| 2006/0132825 A1 | 6/2006 | Czudak et al. | |
| 2006/0215189 A1 | 9/2006 | Yao | |
| 2006/0227394 A1 | 10/2006 | He | |
| 2006/0238800 A1 | 10/2006 | Czudak et al. | |
| 2007/0165252 A1* | 7/2007 | Sasaki | 358/1.9 |
| 2008/0239338 A1* | 10/2008 | Bailey et al. | 358/1.9 |
| 2009/0195798 A1 | 8/2009 | He | |
| 2010/0020339 A1 | 1/2010 | He | |
| 2010/0259802 A1 | 10/2010 | He | |

OTHER PUBLICATIONS

U.S. Appl. No. 12/258,494, filed Oct. 27, 2008, He et al.
U.S. Appl. No. 12/420,490, filed Apr. 8, 2009, He.
Shaked et al., "Ink Relocation for Color Halftones", © Hewlett-Packard Company, 1999, p. 1-11.

* cited by examiner

*Primary Examiner* — Twyler L Haskins
*Assistant Examiner* — Barbara D Reinier
(74) *Attorney, Agent, or Firm* — Philip E. Blair; Fleit Gibbons Gutman Bongini & Bianco P.L.

(57) ABSTRACT

What is provided are a novel system, method, and computer program product for hierarchical (telescopic) color error diffusion which effectively controls the dot distribution for both primary and secondary dot formation which covers the class of error diffusion that follow telescopic dot firing constraint principles. In one example embodiment, an input CMYK ink coverage is received. The input CMYK ink coverage is transformed into a CMYKRGB domain using a CMYK to CMYKRGB conversion. A weighted error value can be added to each color component of the CMYKRGB domain. The color components of the CMYKRGB domain are hierarchically grouped into a plurality of subgroups based on relative dot visibility. More visible subgroups are half-toned earlier to achieve maximum uniform dot distribution. Dots of specific color channels within subgroups are fired based on thresholding and a set of decision rules provided herein.

20 Claims, 4 Drawing Sheets

HIERARCHICAL COLOR ERROR DIFFUSION IN A CMYKRGB DOMAIN

TECHNICAL FIELD

The present invention is directed to systems and methods for color error diffusion for a color half-toning process in a color management system.

BACKGROUND

Raster type printers, which have been implemented with various print engines commonly found in the arts, such as electro-photographic print engines and ink jet print engines, employ half-toning to transform continuous tone image data to print data that can be printed as an array of dots that can be of substantially similar size. For example, 24 bit/pixel continuous tone image data can be half-toned to a plurality of single color one-bit per pixel bitmaps.

For printing with multiple colors, half-toning presents a particular challenge. For dot-on-dot printing, in which printed locations are printed with one or more dots, a single half-toning screen can be used. For instance, a field of 10% blue would have 10% of locations printed with cyan and magenta ink, while 90% of locations remain unprinted. This has the disadvantage of reduced spatial frequency with respect to methods that distribute dots to different locations. This also tends to give the appearance of darker dots more widely spaced apart, producing a grainy image. The same can be said for clustered dot printing techniques in which different color dots may be printed adjacent to each other or otherwise clustered to create a multi-dot cluster that reads as an intermediate color. Accordingly, it is desirable to print the individual dots at closely spaced separate (non-overlapping) locations, relying on the viewer's eye to integrate the different color dots into the intended color.

It can be difficult to achieve substantial uniformity or even distribution of the half-toned dots in dot-on-dot printing devices. Substantial uniformity can be computationally expensive.

One cause of half-tone pattern graininess is spatial luminance variation. A basic property of the color map which is advantageous to control is how the light level, or luminance, changes throughout the color map. Luminance is a photometric quantity which, in essence, is the effect of radiance on our eyes. Radiance is the physical quantity related to light intensity, i.e., the power of the light spreading out in some solid angle over an area. Luminance is a single scalar, (i.e., the integration of radiance weighted with a curve), which describes how efficiently different wavelengths of light trigger cone receptors in our eyes. Because luminance is a weighted integral of radiance, a linear relationship exists between the two. Brightness, on the other hand, is the subjective visual experience of luminance. Roughly, it is the effect of luminance on the brain. Because its a subjective quantity, the relationship of brightness to luminance is non-linear, approximately a cube root.

For multi-function device applications, color error diffusion is a popular half-toning method for copy application, due to its excellent detail preservation and moiré resistance. Color error diffusion can be classified into two types, namely, vector error diffusion and scalar error diffusion. Compared to scalar error diffusion, vector error diffusion is often considered to be better in image quality because vector error diffusion often achieves higher half-tone quality compared to the channel-independent scalar color error diffusion due to the better correlation among CMYK color plane. However, it requires significantly more computation, and can introduce artifacts due to accumulation of the errors in output device space. Vector error diffusion can be slow to diffuse error in the image during the half-toning process due to error accumulation.

Furthermore, half-toning in a CMYK domain does not necessarily result in a well-behaved inter-color correlation among secondary colors (RGB). Consequently, noticeable increases in graininess can be observed when significant amounts of secondary color dots are used to achieve the input ink coverage. Therefore, explicit secondary color dot control is desirable to achieve uniform dot distribution. It is also desirable to position the color dots uniformly in the very highlight and very dark shadow areas due to a requirement of long-distance spatial correlation.

Accordingly, what is needed in this art are increasingly sophisticated applications and advanced methodologies which perform color error diffusion in a color management system.

BRIEF SUMMARY

What is provided are a novel system, method, and computer program product for hierarchical (telescopic) color error diffusion which effectively controls the dot distribution for both primary and secondary dot formation which covers the class of error diffusion that follow telescopic dot firing constraint principles.

In one example embodiment, an input CMYK ink coverage is received. The input CMYK is transformed into a CMYKRGB domain using a CMYK to CMYKRGB conversion. A weighted error value can be added to each color component of the CMYKRGB domain. The color components of the CMYKRGB domain are hierarchically grouped into a plurality of subgroups based on relative dot visibility. Color components of more visible dot subgroups are half-toned earlier to achieve maximum uniform dot distribution. The present hierarchical color error diffusion methodology determines: $KBRG_{mod} = K_{mod} + B_{mod} + R_{mod} + G_{mod}$ and $KBRGCMY_{mod} = KBRG_{mod} + C_{mod} + M_{mod} + Y_{mod}$. If the value of $K_{mod}$ is greater than a predetermined threshold value then $K_0=1$. If $KBRG_{mod}$ is greater than the threshold then a color channel where KBRG has a maximum modified pixel value is turned on (the dot is fired). If $KBRGCMY_{mod}$ is greater than the predetermined threshold value then a color channel where KBRGCMY has a maximum modified pixel value is turned on (the dot is fired).

Advantageously, well-behaved inter-color correlation can be achieved for both primary and secondary color dots as well as between primary and secondary color dots from extreme highlight to dark shadow.

The subject matter disclosed herein will next be described in connection with certain illustrated embodiments. It should be understood that various changes and modifications can be made by those skilled in the art without departing from the spirit or scope of the invention.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a novel system and method for hierarchical (telescopic) color error diffusion which effectively controls the dot distribution for both primary and secondary dot formation which covers the class of error diffusion that follow telescopic dot firing constraint principles. Well-behaved inter-color correlation is advantageously achieved for both primary and secondary color dots as well as between primary and secondary color dots from extreme highlight to dark shadow.

It should be understood that one of ordinary skill in this art would be readily familiar with many facets of color science such as, but not limited to, color space, imaging, color transformation, color calibration, gamut mapping, and other related techniques and algorithms commonly found in the color science arts. Additionally, one of ordinary skill in this art would also be familiar with advanced mathematical techniques for color manipulation and color transformation. One of ordinary skill in this art would also be knowledgeable about computer science and software and programming systems and methods sufficient to implement the functionality and capabilities described in detail herein in their own hardware environments without undue experimentation.

Figure 1:
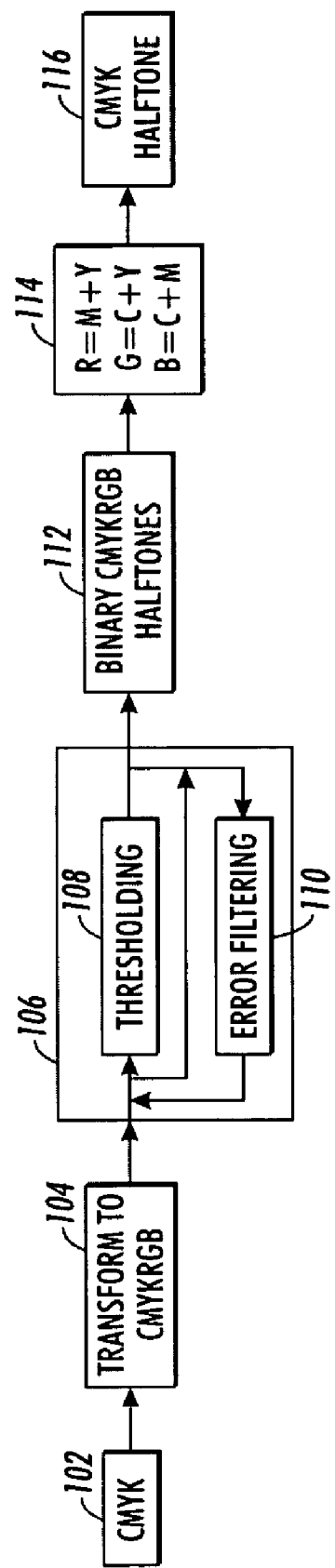
FIG. 1 illustrates a block diagram of one embodiment of a color half-toning process wherein an error diffusion function utilizes a thresholding and error filtering function.

Reference is now being made to FIG. 1 which illustrates a block diagram of one embodiment of a color half-toning process wherein an error diffusion function utilizes a thresholding and error filtering function.

Specifically, at 102, an input CMYK ink coverage is received. At 104, the input CMYK ink coverage is transformed into a CMYKRGB domain. Algorithms for CMYK to CMYKRGB conversion are known in the arts, such as: *Color Printing Half-Toning Method*, U.S. Pat. No. 6,250,733 granted to: Yao et. al. (June 2001), and *Color Printing*, US 2006/0215189 by Meng Yao, both of which are incorporated herein by reference in their entirety. The transformed ink coverages are processed in error diffusion process 106 performing both thresholding 108 and error filtering 110 in a feedback control loop wherein a value of a weighted error is iteratively added to the transformed CMYKRGB until a threshold value has been reached. Once thresholding has been achieved, error diffusion 106 generates a binary CMYKRGB half-tone 112 result. Thereafter, each secondary RGB of the binary CMYKRGB half-tone result is adjusted 114. In this step, R=M+Y, G=C+Y, and B=C+M. A CMYK half-tone result 116 is produced.

Figure 2:
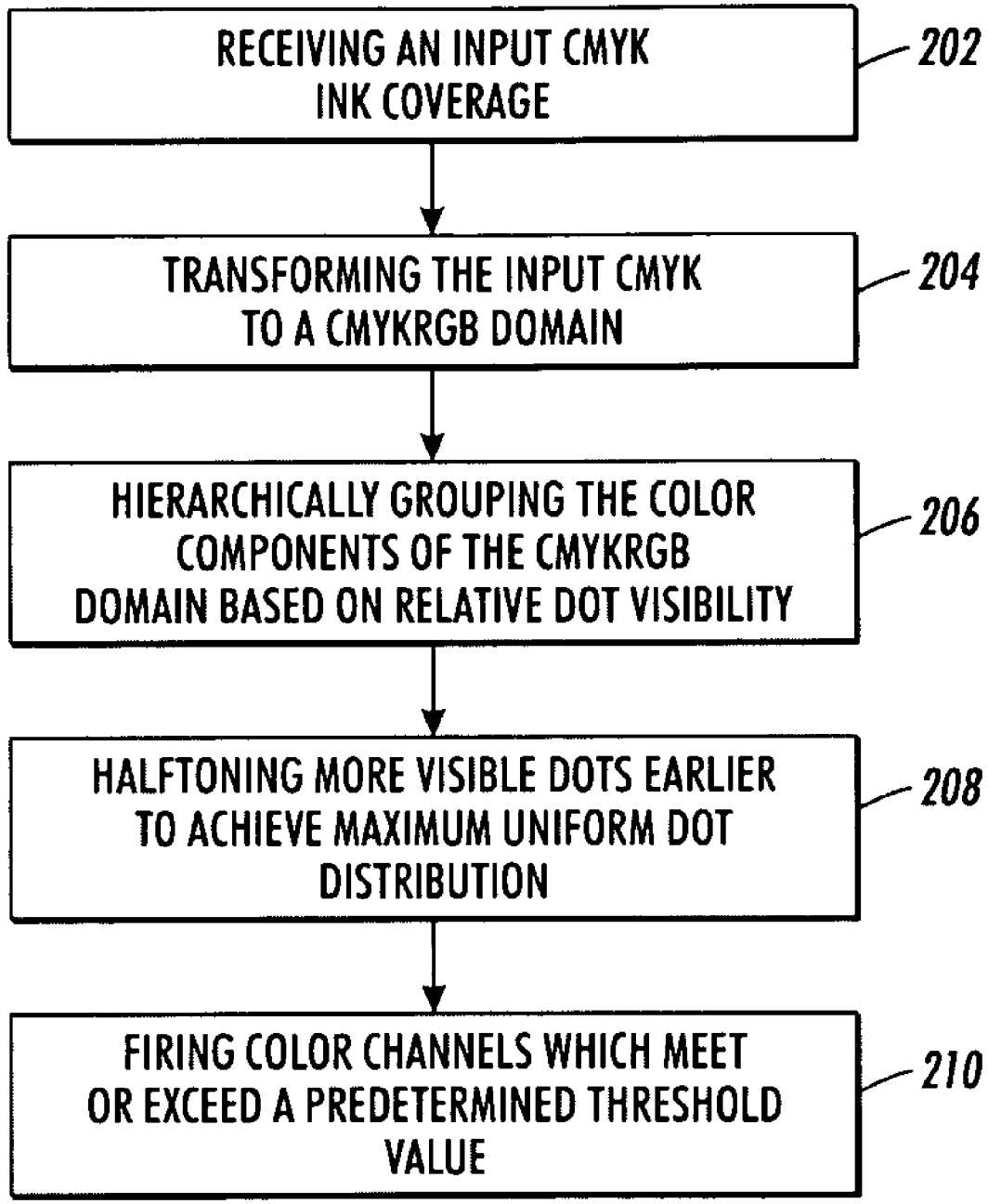
FIG. 2. illustrates a flow diagram of one embodiment of the present method for hierarchical (telescopic) color error diffusion utilizing a thresholding function to determine which color channels are fired.

Reference is now being made to FIG. 2 which illustrates a flow diagram of one embodiment of the present method for hierarchical (telescopic) color error diffusion utilizing a thresholding function to determine which color channels are fired.

At step 202, an input CMYK ink coverage is received. At step 204, the input CMYK is transformed into a CMYKRGB domain using a CMYK to CMYKRGB conversion. A weighted error value can be added to each color component of the CMYKRGB domain. At step 206, the color components of the CMYKRGB domain are hierarchically grouped into a plurality of subgroups based on relative dot visibility. At step 208, color components of more visible dot subgroups are half-toned earlier to achieve maximum uniform dot distribution. At step 210, dots of color channels within the hierarchy of subgroups are fired. Thresholding along with the decision rules of channel-selection for dot firing within a subgroup are discussed herein further with respect to FIG. 3.

Figure 3:
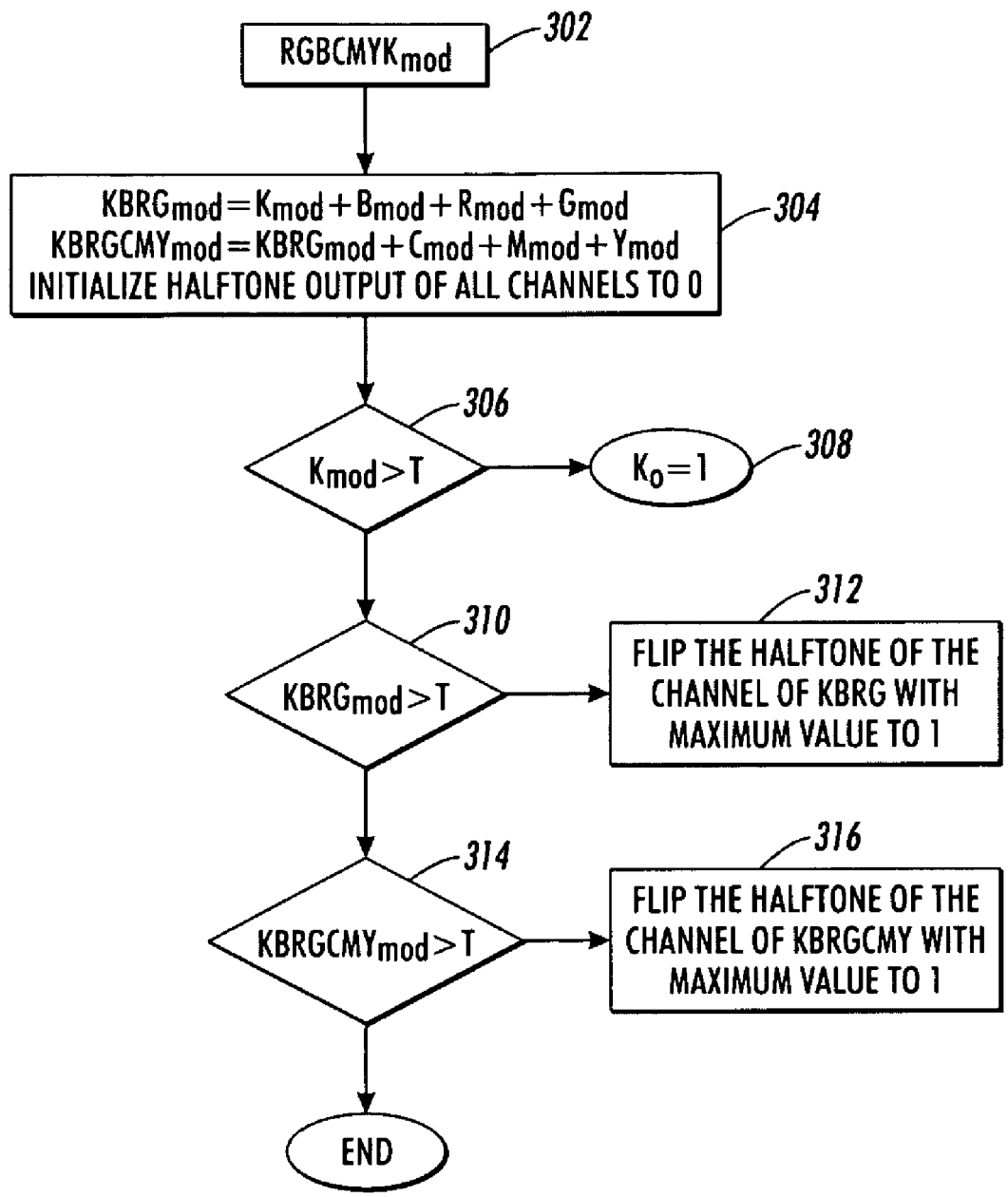
FIG. 3 illustrates a flow diagram of one embodiment of the present method for hierarchical color error diffusion in a CMYKRGB domain.

Reference is now being made to FIG. 3 illustrating a flow diagram of one embodiment of the present method for hierarchical color error diffusion in a CMYKRGB domain.

The modified color channels, given by: $RGBCMYK_{mod}$ 302, are grouped based on dot visibility. More visible dot subgroups are half-toned earlier to achieve maximum uniform dot distribution. At step 304, $KBRG_{mod}$ is the sum of: $K_{mod}+B_{mod}+R_{mod}+G_{mod}$. $KBRGCMY_{mod}$ is the sum of $KBRG_{mod}+C_{mod}+M_{mod}+Y_{mod}$. The half-tone output of all channels is initialized to zero. To half-tone a subgroup of two colors, for example RG, the initial dot enabling is decided by KBRG. At step 306, a determination is first made whether the modified black $K_{mod}$ is greater than the value of threshold T. If it is greater then, at step 308, the $K_0=1$. Otherwise, at step 310, a determination is made whether $KBRG_{mod}$ is greater than threshold T. If it is greater then, at step 312, the channel within KBRG that has the maximum modified pixel value will be turned on (the dot is fired). Otherwise, at step 314, a determination is made whether $KBRGCMY_{mod}$ is greater than threshold T. If it is greater then, at step 316, the channel within KBRGCMY that has the maximum modified pixel value will be turned on (the dot is fired).

It should be understood that the coverage sum of the CMYKRGB channels will be no more than 100%. As a consequence, the exclusive rule of single color dot firing at each pixel location can be enforced during the error diffusion process. As such, at most one of the CMYKRGB channels will be turned on at each pixel location.

The diffusion of error can be channel-independent by having each KRGBCMY channel maintain its own error buffer such that no error exchange occurs across color channels.

This above-described method covers the class of error diffusion that follows the above-described telescopic dot firing constraint principles.

There can be a variation in the channel grouping and constraint ordering. For example, the channels can be grouped into KB, KBRGCM and KBRGCMY. Alternatively, the channels are grouped into K, KB, KBRG, KBRGCM and KBRGCMY. Other variations are envisioned for the decision process as to which channel within a subgroup to fire a dot without necessarily picking the channel with maximum modified input.

It should also be understood that the diagrams depicted herein are illustrative. Other operations, for example, may be added, modified, enhanced, condensed, integrated, or consolidated. Variations thereof are envisioned and are intended to fall within the scope of the appended claims. Furthermore, one of ordinary skill in this art would readily be able to implement the above-described methodology using either a hardware or software construct specific to meet their respective color management needs without undue experimentation.

Figure 4:
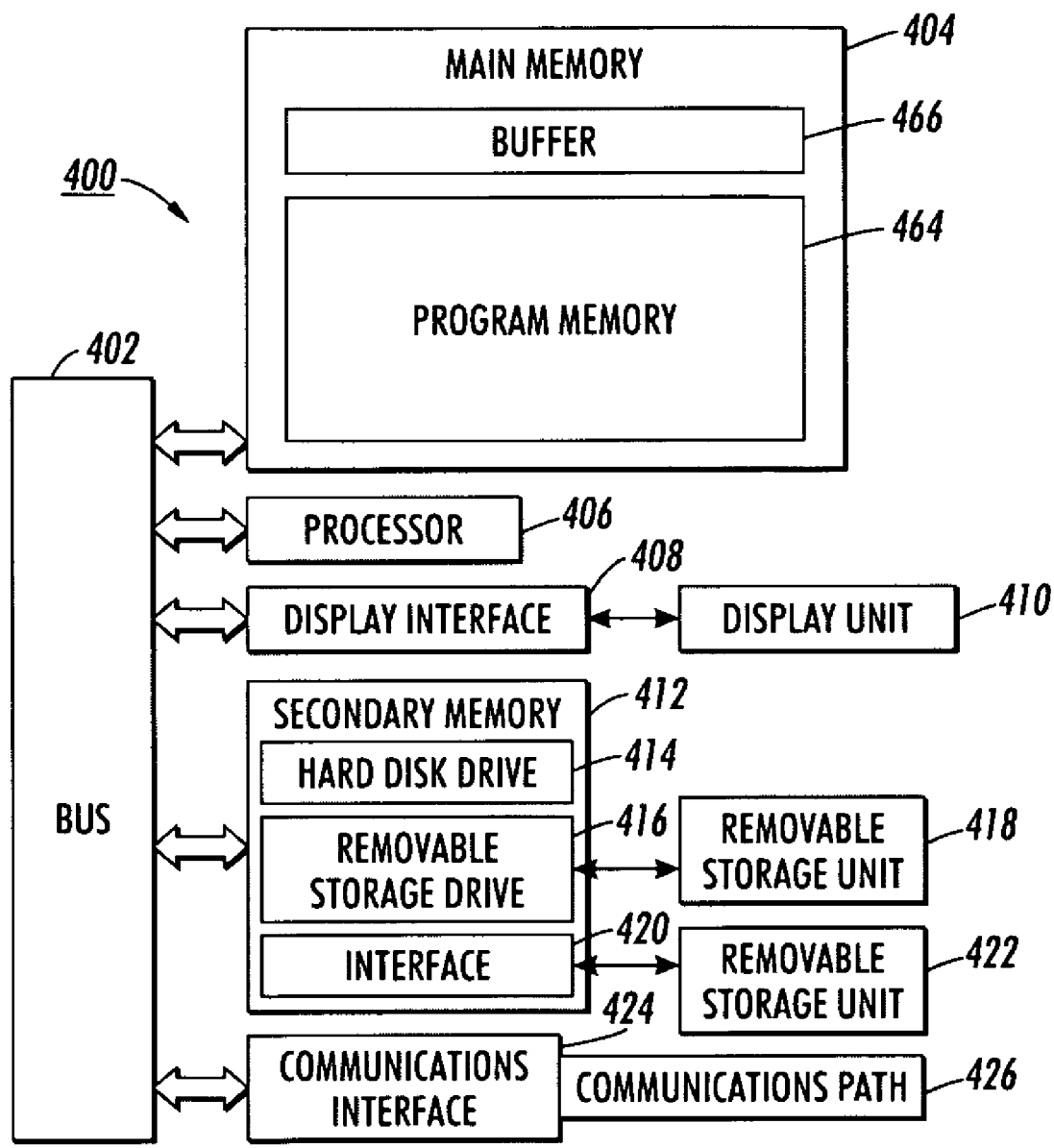
FIG. 4 is a block diagram of a computer system useful for implementing one or more embodiments of the method provided herein.

Reference is now being made to FIG. 4 illustrating a block diagram of one embodiment of a computer system useful for implementing one or more embodiments of the method provided herein.

The computer system 400 can be a xerographic system, a photocopier, or printing device. The computer system includes one or more processors, such as processor 406 capable of executing machine executable program instructions. In the embodiment shown, the processor is in communication with bus 402 (e.g., a backplane interface bus, crossover bar, or data network). The computer system also includes a main memory 404 that is used to store machine readable instructions to be executed by the processor. The main memory is capable of storing data used by or produced by the processor. The main memory may alternatively include random access memory (RAM) to support reprogramming and flexible data storage.

In the embodiment shown, main memory includes buffer 466 to temporarily store data for access by the processor, and a program memory 464 that includes, for example, executable programs that implement the methods described herein. The program memory is capable of storing a subset of the data that is less than all of the data contained in the buffer.

Computer system 400 includes a display interface 408 that forwards data from communication bus 402 (or from a frame buffer not shown) to display 410. The computer system also includes a secondary memory 412. The secondary memory may include, for example, a hard disk drive 414 and/or a removable storage drive 416 which reads and writes to removable storage unit 418, such as a floppy disk, magnetic tape, optical disk, etc., that stores computer software and/or data.

In an alternative embodiment, the secondary memory 412 includes other similar mechanisms for allowing computer programs or other instructions to be loaded into the computer system. Such mechanisms may include, for example, a removable storage unit 422 adapted to exchange data through interface 420. Examples of such mechanisms include a program cartridge and cartridge interface (such as that found in video game devices), a removable memory chip (such as an EPROM, or PROM) and associated socket, and other removable storage units and interfaces 420 which allow software and data to be transferred from the removable storage unit to the computer system.

The computer system 400 includes a communications interface 424 which acts as both an input and an output to allow software and data to be transferred between the computer system and external devices. Examples of a communications interface include a modem, a network interface (such as an Ethernet card), a communications port, a PCMCIA slot and card, etc.

Software and data transferred via the communications interface are in the form of signals which may be, for example, electronic, electromagnetic, optical, or other signals capable of being received by communications interface 424. These signals are provided to communications interface via a communications path (i.e., channel) 426 which carries signals and may be implemented using wire, cable, fiber optic, phone line, cellular link, RF, or other communications channels.

Terms such as, computer program medium, computer executable medium, computer usable medium, and computer readable medium, are used herein to generally refer to media such as main memory 404 and secondary memory 412, removable storage drive 416, a hard disk installed in hard disk drive 414, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions. Furthermore, the computer readable medium may comprise computer readable information in a transitory state medium such as a network link and/or a network interface, including a wired network or a wireless network, that allows a computer to read such computer readable information. Computer programs (also called computer control logic) may be stored in main memory and/or secondary memory. Computer programs may also be received via a communications interface. Such computer programs, when executed, enable the computer system to perform the features and capabilities provided herein.

It should also be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described herein. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for color error diffusion in a color management system, the method comprising:
    receiving an input CMYK ink coverage;
    transforming said input CMYK ink coverage into a CMYKRGB domain;
    hierarchically grouping color components of said CMYKRGB domain into a plurality of subgroups based on relative dot visibility;
    half-toning color components of subgroups in said hierarchy with subgroups of more visible dots being half-toned earlier than subgroups with less visible dots;
    determining which color channels within said subgroups need to be fired; and
    firing dots of said determined color channels.

2. The method of claim 1, wherein said color channels are grouped into one of: (KB, KBRGCM, KBRGCMY), and (K, KB, KBRG, KBRGCM, KBRGCMY).

3. The method of claim 1, further comprising adding a weighted error value to each color component of said CMYKRGB domain.

4. The method of claim 1, further comprising:
    determining $KBRG_{mod}=K_{mod}+B_{mod}+R_{mod}+G_{mod}$; and
    determining $KBRGCMY_{mod}=KBRG_{mod}+C_{mod}+M_{mod}+Y_{mod}$.

5. The method of claim 4, further comprising, in response to a modified black $K_{mod}$ being greater than a predetermined threshold value, firing a color channel wherein $K_0=1$.

6. The method of claim 4, further comprising, in response to a $KBRG_{mod}$ being greater than a predetermined threshold value, firing a color channel wherein KBRG has a maximum modified pixel value.

7. The method of claim 4, further comprising, in response to $KBRGCMY_{mod}$ being greater than a predetermined threshold value, firing a color channel wherein KBRGCMY has a maximum modified pixel value.

8. A system for color error diffusion in a color management system, the system comprising:
    a storage medium capable of storing data; and
    a processor in communication with said storage medium, said processor capable of executing a machine readable instruction for performing the method of:
        receiving an input CMYK ink coverage;
        transforming said input CMYK ink coverage into a CMYKRGB;
        hierarchically grouping color components of said CMYKRGB domain into a plurality of subgroups based on relative dot visibility;
        half-toning color components of subgroups in said hierarchy with subgroups of more visible dots being half-toned earlier than subgroups with less visible dots;
        determining which color channels within said subgroups need to be fired; and
        firing dots of said determined color channels.

9. The system of claim 8, wherein said color channels are grouped into one of: (KB, KBRGCM, KBRGCMY), and (K, KB, KBRG, KBRGCM, KBRGCMY).

10. The system of claim 8, further comprising adding a weighted error value to each color component of said CMYKRGB domain.

11. The system of claim 8, further comprising:
    determining $KBRG_{mod}=K_{mod}+B_{mod}+R_{mod}+G_{mod}$; and
    determining $KBRGCMY_{mod}=KBRG_{mod}+C_{mod}+M_{mod}+Y_{mod}$.

12. The system of claim 11, further comprising, in response to a modified black $K_{mod}$ being greater than a predetermined threshold value, firing a color channel wherein $K_0=1$.

13. The system of claim 11, further comprising, in response to a $KBRG_{mod}$ being greater than a predetermined threshold value, firing a color channel wherein KBRG has a maximum modified pixel value.

14. The system of claim 11, further comprising, in response to $KBRGCMY_{mod}$ being greater than a predetermined threshold value, firing a color channel wherein KBRGCMY has a maximum modified pixel value.

15. A computer program product for thresholding in a color error diffusion in a color management system, the computer program product comprising:
    a non-transitory computer readable medium for computer-usable data carrier storing instructions that, when executed on a computer, cause the computer to perform a method comprising:
        receiving an input CMYK ink coverage;
        transforming said input CMYK ink coverage into a CMYKRGB domain;
        hierarchically grouping color components of said CMYKRGB domain into a plurality of subgroups based on relative dot visibility;
    half-toning color components of subgroups in said hierarchy with subgroups of more visible dots being half-toned earlier than subgroups with less visible dots;
    determining which color channels within said subgroups need to be fired; and
    firing dots of said determined color channels.

16. The computer program product of claim 15, wherein said color channels are grouped into one of: (KB, KBRGCM, KBRGCMY), and (K, KB, KBRG, KBRGCM, KBRGCMY).

17. The computer program product of claim 15, further comprising adding a weighted error value to each color component of said CMYKRGB domain.

18. The computer program product of claim 15, further comprising:
    determining $KBRG_{mod}=K_{mod}+B_{mod}+R_{mod}+G_{mod}$; and
    determining $KBRGCMY_{mod}=KBRG_{mod}+C_{mod}+M_{mod}+Y_{mod}$.

19. The computer program product of claim 18, further comprising, in response to a modified black $K_{mod}$ being greater than a predetermined threshold value, firing a color channel wherein $K_0=1$.

20. The computer program product of claim 18, further comprising, in response to a $KBRG_{mod}$ being greater than a predetermined threshold value, firing a color channel wherein KBRG has a maximum modified pixel value.

* * * * *